United States Patent
Tulodziecki et al.

(10) Patent No.: US 12,537,202 B2
(45) Date of Patent: Jan. 27, 2026

(54) BATTERY CELLS COMPRISING ELASTIC COMPRESSIBLE FUNCTIONAL LAYERS AND MANUFACTURING PROCESS

(71) Applicant: Nederlandse Organisatie voor toegepast-natuurwetenschappelijk onderzoek TNO, 's-Gravenhage (NL)

(72) Inventors: Michal Tulodziecki, Woluwe-Saint-Lambert (BE); Sandeep Unnikrishnan, Veldhoven (NL); Franky Flory Vercauteren, Eindhoven (NL); Lucas Augustinus Haverkate, Utrecht (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 751 days.

(21) Appl. No.: 17/294,957

(22) PCT Filed: Dec. 5, 2019

(86) PCT No.: PCT/NL2019/050809
§ 371 (c)(1),
(2) Date: May 18, 2021

(87) PCT Pub. No.: WO2020/117060
PCT Pub. Date: Jun. 11, 2020

(65) Prior Publication Data
US 2022/0020991 A1    Jan. 20, 2022

(30) Foreign Application Priority Data

Dec. 6, 2018  (EP) .................................. 18210849

(51) Int. Cl.
*H01M 4/62*    (2006.01)
*H01M 4/139*   (2010.01)
(Continued)

(52) U.S. Cl.
CPC ............. *H01M 4/62* (2013.01); *H01M 4/139* (2013.01); *H01M 4/64* (2013.01);
(Continued)

(58) Field of Classification Search
CPC ...... H01M 4/665; H01M 4/666; H01M 4/668; H01M 4/808; H01M 4/62; H01M 4/139;
(Continued)

(56) References Cited

U.S. PATENT DOCUMENTS

2011/0086294 A1    4/2011  Xiao et al.
2011/0274983 A1*  11/2011  Yontz ................ H01M 10/0565
                                                      429/309
(Continued)

FOREIGN PATENT DOCUMENTS

CN    102130329 A    7/2011
CN    102449813 A    5/2012
(Continued)

OTHER PUBLICATIONS

Machine English translation of JP 2005-100804 (Year: 2005).*
(Continued)

*Primary Examiner* — Michael L Dignan
(74) *Attorney, Agent, or Firm* — Leydig, Voit & Mayer, Ltd.

(57) ABSTRACT

The present disclosure concerns a rechargeable battery cell comprising a compressible elastic composite material to form one or more of: a compressible and elastic first current collector; and a compressible and elastic positive electrode; and a compressible and elastic solid state electrolyte; and a compressible and elastic negative electrode; and a compressible and elastic second current collector, wherein the compressible elastic composite material comprises a plurality of compressible pores.

6 Claims, 4 Drawing Sheets

(51) Int. Cl.
*H01M 4/64* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2300/0065* (2013.01)

(58) Field of Classification Search
CPC ............... H01M 4/64; H01M 10/0525; H01M 2004/021; H01M 2300/0065; H01M 10/05; H01M 4/04; C08L 2207/53; Y02E 60/10; Y02P 70/50
See application file for complete search history.

(56) References Cited

U.S. PATENT DOCUMENTS

| | | | | |
|---|---|---|---|---|
| 2015/0050543 | A1* | 2/2015 | Christensen | H01M 10/052 429/623.5 |
| 2015/0311001 | A1* | 10/2015 | Kato | H01G 11/06 429/217 |
| 2015/0340699 | A1* | 11/2015 | Chami | H01M 4/0414 429/234 |
| 2016/0042878 | A1* | 2/2016 | Kato | H01M 4/661 429/217 |
| 2019/0088951 | A1* | 3/2019 | Hanazaki | H01M 4/668 |
| 2019/0245211 | A1* | 8/2019 | Wandera | H01G 11/86 |
| 2021/0020920 | A1* | 1/2021 | Pan | H01M 4/622 |

FOREIGN PATENT DOCUMENTS

| | | | | |
|---|---|---|---|---|
| CN | 105722868 | A | | 6/2016 |
| CN | 106104848 | A | | 11/2016 |
| EP | 2437333 | A1 | | 4/2012 |
| JP | 2001023692 | A | | 1/2001 |
| JP | 2001185152 | A | | 7/2001 |
| JP | 2005-100804 | | * | 4/2005 ............. H01M 4/02 |
| JP | 2005100804 | A | | 4/2005 |
| JP | 2012517686 | A | | 8/2012 |
| JP | 2016058343 | A | | 4/2016 |
| WO | WO 2015/114074 | A1 | | 8/2015 |
| WO | 2016208480 | A1 | | 12/2016 |
| WO | WO 2017/023830 | A1 | | 2/2017 |
| WO | 2018193992 | A1 | | 10/2018 |

OTHER PUBLICATIONS

Bibin et al. "Syntactic Foams." Handbook of Thermoset Plastics (3rd ed.), Eds. Dodiuk et al., pp. 511-554, William Andrew Publishing, 2014 (Year: 2014).*
Zhou et al. "Scalable preparation of hollow polymer and carbon microspheres by spray drying and their application in low-density syntactic foam." Materials Chemistry and Physics 181 (2016) 150-158 (Year: 2016).*
Cao et al. "In situ synthesis of flexible elastic N-doped carbon foam as a carbon current collector and interlayer for high-performance lithium sulfur batteries." J. Mater. Chem. A., 2016, 4, 8636 (Year: 2016).*
Liang et al. "Compression and recovery of carbon nanotube forests described as a phase transition." International Journal of Solids and Structures 122-123 (2017) 196-20 (Year: 2017).*
Japan Patent Office, Notice of Reasons for Rejection in corresponding Japanese Patent Application No. 2021-528351 dated Oct. 31, 2023.
Jiahui Yu et al., "Nano-biomedicine," National Key Book for the 12$^{th}$ Five-Year Plan, (2011) 8 pages.
European Patent Office, International Search Report in corresponding International Application No. PCT/NL2019/050809, dated Jun. 24, 2020 (4 pages).
Charles J. McDonald et al., "Hollow latex particles: synthesis and applications," Advances in Colloid and Interface Science, 99 (2002) pp. 181-213, XP002292602.
Japan Patent Office, Notice of Reasons for Refusal in corresponding Japanese Patent Application No. 2021-528351 dated Jun. 26, 2024.
Japanese Patent Office, Notice of Reasons for Refusal in corresponding Japanese Patent Application No. 2021-528351 dated Mar. 12, 2025.

* cited by examiner

BATTERY CELLS COMPRISING ELASTIC COMPRESSIBLE FUNCTIONAL LAYERS AND MANUFACTURING PROCESS

CROSS-REFERENCE TO RELATED APPLICATIONS

This patent application is a U.S. National Phase of PCT International Application No. PCT/NL2019/050809, filed Dec. 5, 2019, which claims priority to European Application No. 18210849.8, filed Dec. 6, 2018, which are both expressly incorporated by reference in their entireties, including any references contained therein.

TECHNICAL FIELD AND BACKGROUND

The present disclosure relates to solid state batteries. In case of 3D and 2D all solid state batteries the functional layers are typically compactly packed together in a stack. In typical battery applications volume changes between a discharged and charged battery state may be as large as 20%, e.g. a factor 1.2. Expansion, e.g. swelling, within the stack may be caused by formation of a negative electrode, e.g. electrode layer, during a first charge cycle of the rechargeable battery. Correspondingly, during discharge the volume of the negative electrode may decrease, e.g. shrink. For micro batteries where the amount of active materials is very low and therefore volume changes during charge and discharge are very low, a design comprising dense packed layers may work well. When moving to 3D and 2D batteries for large applications, e.g. larger energy densities, this may no longer be the case, high volume expansions may lead to defect formation, e.g. crack formation and/or propagation, and/or decrease of ionic- or electric conductance between layers within the stack. A number of different approaches exist which, to some extent, try to address the above problems.

A first approach involves the use of a 3D structured porous solid state electrolyte over the current collector. Wang, C. W. et al. in Nano Lett. 17, 17, 565-571, describe a porous solid state ceramic electrolyte composite in which, during charging, the lithium electrode material can fill existing pores in the solid state electrolyte. However, this solution is applicable only for 2D batteries as high sintering temperature needed to create the ceramic damages other components of the 3D structure. Furthermore, much space is taken by the electrochemically inactive ceramic material, thus diminishing the energy density, e.g. energy per volume, and energy per weight ratio of such batteries. Moreover, the high surface contact area, and long diffusion pathways through the pores during lithium plating are undesirable as these may lead to parasitic reactions.

A second approach involves the formation of a porous current collector. Antunes, M., et al., in Polym. Sci. 2014, 39, 486-509 describe a lithium cell comprising a porous current collector formed of copper nanowires. During plating, lithium may fill in the pores within the current collector. A drawback of using porous electrically conducting current collectors is that these can only be used in combination with liquid electrolytes as the porous current collector does not provide ionic conductivity. When such current collector is used in lithium battery with a solid state electrolyte, lithium would plate only at the current collector-electrolyte interface and not fill in the pores.

A third approach involves applying external pressure onto the stack of functional layers (e.g. elastic casing or springs on pouch cell level). U.S. Ser. No. 10/786,418 describes a pouch-type cell in an elastic/plastic casing that keeps the stack under continuous pressure. This design reduces loss of electric contact between layers during a contraction of the stack. However, this design does not prevent volume expansion, which may still cause damage, e.g. cracking, to the cells, and would not be suitable for anode free designs where high volume expansions are expected. Moreover, very often plastic deformations of the cell stack are observed, that lead to damage of the battery.

A fourth approach involves providing a battery with a compressible and expandable inactive layer. US20170365841 describes enclosing an elastic layer in a cylindrical, AAA-type, Zn-air battery. Besides introducing a large volume of electrochemical inactive material, such design can not be used in lithium batteries because the design adds an insulating layer between functional layers preventing charge transport across a continuous stack. Also, such approach leads to significant amount of dead volume and mass (inactive parts of battery), thus lowering the energy density of the battery.

The present disclosure addresses one or more of the above limitations by describing cells comprising a functional layer that is capable of volume compression and expansion in order to at least partially compensate volume changes in other layers of the battery during charge and discharge cycles.

SUMMARY

Aspects of the present disclosure relate to a rechargeable battery cell comprising a compressible elastic composite material to form one or more of: a compressible and elastic first current collector; and a compressible and elastic positive electrode; and a compressible and elastic solid state electrolyte; and a compressible and elastic negative electrode; and a compressible and elastic second current collector, wherein the compressible elastic composite material comprises a plurality of compressible pores and wherein the compressible elastic composite material is configured to, at least in part, counter act compressive and/or tensile forces within the cell resulting from volume changes in the negative and/or positive electrode during charging and/or discharging of the rechargeable battery cell.

Preferably, the elastic composite material counter acts compressive and/or tensile forces within the rechargeable battery cell repeatedly, e.g. over a multitude of charging and discharging cycles, e.g. over the life time of the cell, in a resilient way, e.g. without significant degradation. Preferably, the compressible and elastic layer is composed of elastic matrix to obtain desired mechanical properties and resilient behavior of the layer.

In a preferred embodiment, the compressible pores have a diameter that is less than 20% of a thickness of the compressible elastic composite material (C) the pores are comprised in, and wherein the combined volume of the pores is in the range of 30 to 150%, more preferably in the range of 100 to 120%, of the volume changes in the negative and/or positive electrode during charging and/or discharging of the rechargeable battery cell.

The present disclosure may be advantageously applied to researchable battery cells that are especially prone to damage due to volume changes in the negative and/or positive electrode. Accordingly, the present disclosure advantageously further relates to rechargeable battery cells, wherein the cell is formed of a conductive base structure comprising an array of conductive elements spaced at a distance from one another and extending in a direction away from said base, and wherein at least one of the electrode and solid state electrolyte is provided between said elements, e.g. 3D battery cells.

In some preferred embodiments the disclosure relates to a rechargeable battery cell wherein the compressible pores are at least in part provided by hollow latex beads. Preferably, hollow latex beads with a volumetric core to shell ratio (Vcore/Vshell) in a range from 5 to 0.05. Preferably, the hollow latex beads have a diameter in a range between 100 nanometer and 5 micrometer.

The present disclosure further relates to a process for manufacturing a rechargeable battery cell comprising a compressible elastic composite material. The process comprises one or more of: providing a compressible elastic composite material to form a compressible and elastic first current collector; providing a compressible elastic composite material to form a compressible and elastic positive electrode; providing a compressible elastic composite material to form a compressible and elastic solid state electrolyte; providing a compressible elastic composite material to form a compressible and elastic negative electrode; and providing a compressible elastic composite material to form a compressible and elastic second current collector. The plurality of compressible pores is provided to the compressible elastic composite material by preparing a mixture comprising one or more pore forming agents and wherein addition of solid state electrolyte forming material allows forming a compressible and elastic solid-state electrolyte, and wherein addition of the electrode material allows forming a compressible and elastic electrode, and wherein addition of the current collector material allows forming a compressible and elastic current collector. The pore forming agents comprise one or more of: hollow particles, hollow latex beads, and foaming agents, high vapor pressure solvents, or dissolved gasses.

In some embodiments, wherein the pore forming agents are hollow latex beads the process further comprises steps to obtain said hollow latex beads. Advantageously hollow latex beads may be manufactured in a process starting from core-shell polymer latex beads, wherein the core comprises an aqueous gel, followed by drying the core-shell polymer latex beads by freeze-drying or by a liquid-gas phase exchange process using a dry gas flow. Accordingly the present disclosure also relates to hollow latex beads obtainable by such process

BRIEF DESCRIPTION OF DRAWINGS

These and other features, aspects, and advantages of the apparatus, systems and methods of the present disclosure will become better understood from the following description, appended claims, and accompanying drawing wherein:

DETAILED DESCRIPTION

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

In electronic devices electronic circuits may be equipped with current collectors of a type such as in electrochemical devices. For example an electrochemical device is a battery such as a rechargeable Li-ion solid-state battery having current collector of non-planar design. In discharging battery mode, the anode is the "negative electrode" to which the positive current flows, from the cathode, being the "positive electrode". During charge these functions are reversed. Irrespective charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode during battery discharge) materials are $Li_4Ti_5O_{12}$ (Lithium Titanate spinel or LTO); $LiC_6$ (Graphite); $Li_{4.4}Si$ (Silicon) and $Li_{4.4}Ge$ (Germanium) known positive electrode (cathode) materials are $LiCoO_2$ (Lithium Cobalt oxide or LCO), $LiCoPO_4$, (doped) $LiMn_2O_4$ (Lithium manganese oxide spinel or LMO), $LiMnPO_4$, $LiFePO_4$ (LFP), $LiFePO_4F$ (LFPF) or $LiCo_{1/3}Ni_{1/3}Mn_{1/3}O_2$ (LCNMO).

The positive electrode (cathode) may comprise insertion or conversion based materials. Suitable materials may, for example, be selected from a group consisting of metal oxides, silicon, graphitic materials, sulphur, phosphates, oxygen, and air. For Li-ion batteries it may for example comprise $LiCoO_2$, $MnO_2$, $LiMn_2O_4$, $LiNiO_2$, $Li_x(Mn_yNi_{1-y})_{2-x}O_2$, $LiNi_{1-x}Co_xO_2$, $LiNi_xCo_yAl_zO_2$, $Li(Ni_{1/3}Mn_{1/3}Co_{1/3})O_2$, $LiFePO_4$, $Li_2FePO_4F$, $V_2O_5$, $V_2O_5\text{-}TeO_2$, $WO_3\text{-}V_2O_5$, $TiS_xO_y$, $MO_x$, $MS_x$ or $Li\text{—}V_2O$. For other ion insertion type batteries, the positive electrode layer may for example comprise similar materials as listed above for Li-ion batteries, but with the Li being substituted by the other ion. For example, for Na-ion batteries the first electrode layer 12 may e.g. comprise $NaMn_2O_4$; for Mg-ion batteries the first electrode layer may e.g. comprise MgMn2O4; and for Al-ion batteries the first electrode layer may e.g. comprise AlxV2O3, the present disclosure not being limited thereto.

Thin film ion batteries, including those of the thin film solid state lithium ion type, can be prepared from various deposition techniques to fabricate negative electrode, positive electrode, and electrolyte materials bonded together to form the battery. Such techniques may typically include depositing thin films of such materials using vacuum deposition or other techniques that result in similar thin films, to produce the "thin film" batteries. Thin film batteries are often employed in applications in which space and weight may preferably be conserved and extremely long cycle life may be desired.

A 3D battery typically comprises a structured current collector formed of a base structure comprising an array of conductive elements spaced at a distance from one another and extending in a direction away from said base. Onto these elements further function layers, e.g. electrode, and/or electrolyte, are provided in a conformal way such that the 3D cell comprises a larger interface area between functional layers, and may provide larger currents, than a corresponding 2D cell.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be manufactured or operated in a particular orientation unless stated otherwise.

Figure 1A:
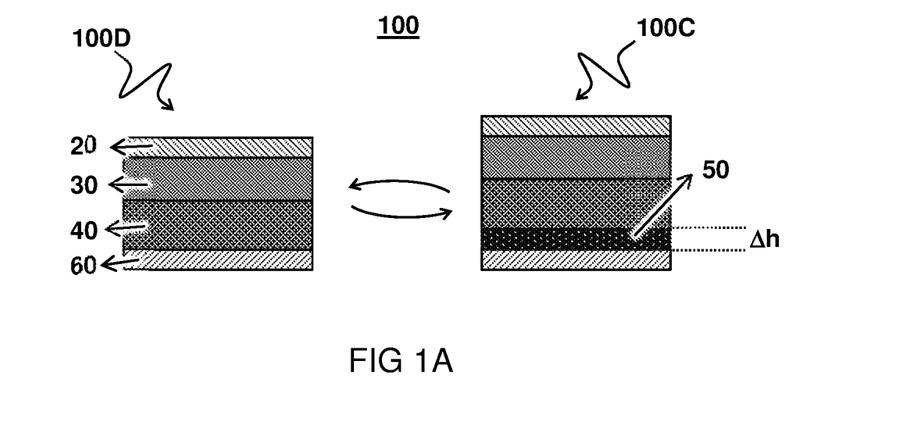
FIG. 1A depicts a schematic cross-section views of a rechargeable battery cell in charged and discarded state illustrating volume changes in the negative electrode between these states.
Figure 1B:
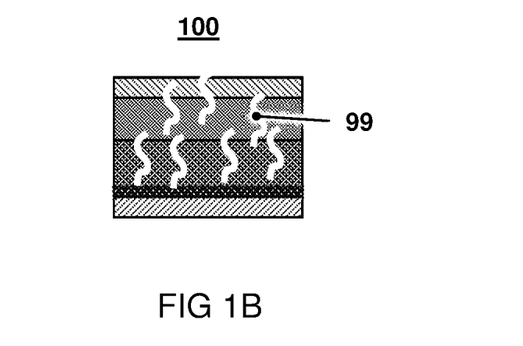
FIG. 1B depicts a schematic a cross-section view of a damaged rechargeable battery cell due to formation of cracks.

FIG. 1A schematically depicts on the left a cross section view of a rechargeable thin film battery 100 in a completely discharged state 100D (left) and charged state 100C (right). The discharged battery cell comprises a rigid top current collector 20, a layer comprising a positive electrode material 30, a solid state electrolyte layer 40 and a bottom current collector 60 to receive a negative electrode material during charging. During a charging cycle ionic negative electrode material is transported towards the bottom current collector where is reduced to form a layer of negative electrode material 50. During a discharge cycle the deposited negative electrode material may be re-oxidized thereby by releasing electrons to an externally connected circuit and transporting oxidize ions towards the positive electrode. Inevitably these oxidization and reduction processes are accompanied by volume changes Δh within the battery cell. Typically, batteries are provided with rigid external current collectors, for example in the form of a rigid external casing. A larger desired capacity of a battery requires the use of larger amounts of electrode materials which may result in larger volume changes. As illustrated in FIG. 1B volume changes may lead to degradation of a battery. An increase of volume, e.g. during a charging cycle, may lead to damage or breaking of the battery and/or its rigid layers. A decrease in volume may, e.g. during a discharging cycle, may lead to delamination, and/or formation of cracks 99 in and/or in between layers.

Figure 1C:
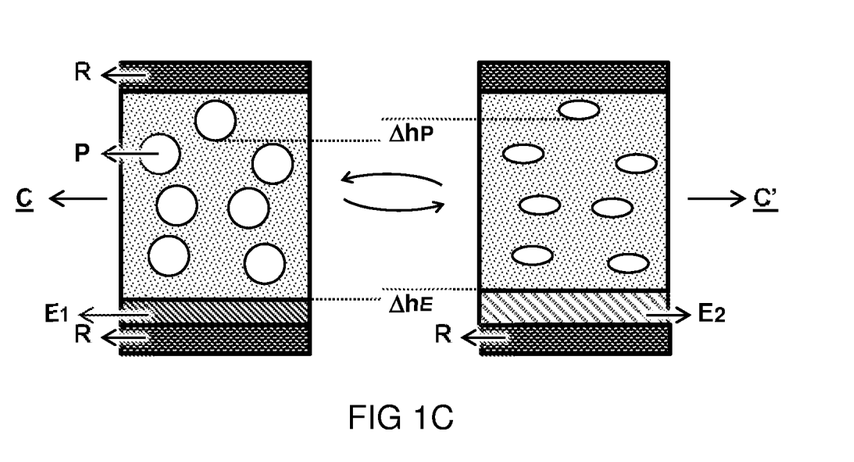
FIG. 1C depicts a schematic cross-section view of a stack of layers wherein a compressible elastic composite material counteracts volume changes within the stack.

FIG. 1C schematically depicts a side view cross section of a stack formed of a compressible elastic composite material C and a reversibly expandable layer E sandwiched between two rigid layers R. The compressible elastic composite material C,C' is formed of a continuous phase and comprises a plurality of compressible pores P. By providing the composite material with compressible pores the composite layer may counteract compressive forces within the stack, e.g. forces generate due to a volume change in layer E. Rather than redistributing the force, the compressible elastic composite material C, may advantageously contract thus mitigating an overall volume increase of the stack. By providing the stack with a composite material layer that is compressible, said layer may counteract compressive forces within the stack. In other words, the compressible composite material C may accommodate to compressive forces by reducing its volume through a compressing of the pores. By providing the stack with a composite material layer that is compressible and elastic said layer may counteract compressive and tensile forces within the stack. In other words, the compressible elastic composite material C may accommodate to compressive forces by reducing its volume ΔhE through a compressing of the pores ΔhP, whereas it may accommodate to tensile forces by increasing its volume through a (re) expansion of the pores.

Accordingly, the present disclosure relates to rechargeable battery cells comprising a compressible elastic composite material C. This compressible elastic composite material C may advantageously be combined into one or more of the functional layers comprised in a battery stack. Accordingly the present disclosure relates to a rechargeable battery cell 1 comprising a compressible elastic composite material C to form one or more of:

a compressible and elastic first current collector 2; and
a compressible and elastic positive electrode 3; and
a compressible and elastic solid state electrolyte 4; and
a compressible and elastic negative electrode 5; and
a compressible and elastic second current collector 6, wherein the compressible elastic composite material C comprises a plurality of compressible pores P and wherein the compressible elastic composite material C is configured to, at least in part, counter act compressive and/or tensile forces within the stack resulting from volume changes in the negative and/or positive electrode during charging and/or discharging of the rechargeable cell.

In a preferred embodiment, the compressible layer is composed of an elastic continuous phase, e.g. a matrix, to obtain desired mechanical properties and resilient behavior of the layer. In some embodiments, the compressible elastic composite material C comprises an elastic polymer such as, but not limited, to polyurethane, spandex, variety of rubbers ethylene vinyl acetate, polyisoprene, nitryl butacliene, polybutadiene, polyesters, polycarbonates, polyamides, silicone. By providing the composite material C with an elastic polymer the compressible layer may re-expand upon release of the compressive force. Alternatively, or in addition the compressible elastic composite material C may comprise copolymers and/or polymer blends comprising an elastic polymer wherein additional functionality is provided through one or more of an electrically conductive polymer and an ion conductive polymer. Accordingly, the present disclosure relates to a rechargeable battery cell 1 wherein the compressible elastic composite material C also possess electrochemical properties as ion- or electronic conductivity. An ion conductive compressible elastic composite material C may, for example, be provided through a combination comprising a suitable elastic/ion conductive copolymer, e.g. a poly(ethylene vinyl acetate)-co-polyethylene oxide. An electrically conductive compressible elastic composite material C may, for example, be provided by a blend of an elastic polymer and a conductive additive, e.g. polyurethane polymer with carbon additive.

Preferably, the compressible elastic composite material C is a resilient material, e.g. the material is suited to repeatedly compensate volume changes within the rechargeable battery cell.

Preferably, the compressible pores P are homogeneously dispersed throughout the compressible elastic composite material C. By dispersing the compressible pores P throughout the compressible elastic composite material C in a homogeneous way, compressive and tensile deformations may be accommodated for evenly. Thereby, local disturbances in electric fields and/or ion diffusion distances may be avoided, thereby mitigation battery degradation.

In some embodiments, the compressible elastic composite material C and the pores P form a foam, e.g. a sponge, or micro foam, e.g. a micro-porous structure with voids.

Figure 2A:
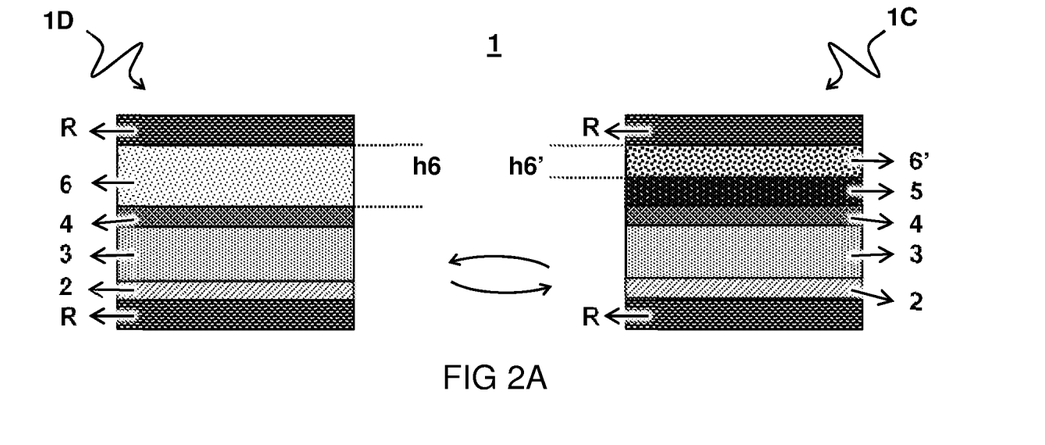
FIG. 2A depicts a schematic cross-section view of a rechargeable battery cell comprising a compressible and elastic current collector.

FIG. 2A depicts schematic cross-section views of a rechargeable battery cell 1 in a discharged 1D (left) and charged state 1C (right). The cell is formed of a stack of functional layers comprising a first current collector 2, a positive electrode 3, a solid state electrolyte 4, and a compressible and elastic second current collector 6,6', the stack sandwiched between two rigid external current collectors R. During a charging cycle a negative electrode 5 is formed onto the second current collector 6. In one preferred embodiment, e.g. as shown in FIG. 2 the compressible elastic composite material C forms an elastic and compressible current collector. During charging the elastic and compressible current collector 6 counteracts volume changes in the battery stack by compressing, e.g. reducing its volume, indicated by a change in thickness of the compressible and elastic current collector from initial thickness h6 to reduced thickness h6'. Conversely, during discharging, the compressible and elastic current collector re-expands thereby compensation shrinkage in of the negative electrode layer and mitigating volumes changes in the battery cell as a whole.

Preferably, the compressible pores have a diameter that is less than 20% of a thickness of the compressible elastic composite material C the pores are comprised in. Providing the compressible elastic composite material C with pores with a small dimeter enables homogeneous distribution of the plurality of pores thought the layer they are comprised in. By dispersing distribution of the plurality of pores homogeneously compressive and tensile deformations may be accommodated for evenly. By using pores with a maximum diameter of 20% of the thickness of the layer they are comprised in, uneven pore distribution may be mitigated. A dimension of 20% was found to be a maximum at which plastic deformation may be avoided. Preferably, the combined volume of the pores in the compressible elastic composite material C is in the range of 30 to 150%, more preferably in the range of 100 to 120%, of the volume changes in the negative and/or positive electrode during charging and/or discharging of the rechargeable battery cell. The total pore volume is believed to correspond the maximum compressibility of the compressible elastic composite material C. By providing the compressible elastic composite material C with an increasing total pore volume may allow accommodating increasing volume changes in the electrodes. By providing the compressible elastic composite material C with a total pore volume that is similar to the expected volume changes of the electrode materials, the compressible elastic composite material C may completely counteract said volume changes within the cell. Providing the compressible elastic composite material. C with a total pore volume that exceeds the expected volume changes of the negative and/or positive electrode may not further contribute towards counteracting dais volume changes. The part of the total pore volume that exceeds the expected volume changes of the electrode materials may be considered as an unwanted dead volume, e.g. a volume that does not contribute the to the performance or integrity of the rechargeable battery cell 1. In typical battery applications, the above limitations to pore dimension correspond to pores having a dimension in a range between 10 micrometer and 50 nanometer, preferably between 5 micrometer and 100 nanometer, more preferably between 1 micrometer and 100 nm. It will be appreciated that the maximum thickness relates on the thickness of the compressible elastic composite material C layer the pores are comprised in. Thicker layers, e.g. a second current collector with a thickness of 50 micrometer allow for the use of larger pores than thin layers, e.g. a solid state electrolyte layer with a thickness of 1 micrometer.

In another or further embodiment, the compressible pores are at least in part provided by compressible hollow particles 10. Preferably, these particles comprise an elastic shell structure surrounding a hollow core. Particularly, for rechargeable battery cells wherein the compressible elastic composite material is to be provided in high aspect ratio structures, e.g. in between extending elements of a 3D battery, the pores may be preferably be provided by compressible hollow particles 20, as pore formation and pore distribution in foams may be hard to control, especially in 3D structures. Preferably, the compressible hollow particles 10 have a diameter in a range between 10 micrometer and 50 nanometer, preferably between 5 micrometer and 200 nanometer, more preferably between 1 micrometer and 300 nm. Using smaller compressible hollow particles 10 may allow the formation of thin compressible and elastic composite functional layers. Using thin compressible and elastic composite functional layers may allow manufacturing of high energy density rechargeable battery cells. It will be appreciated that, similar to the dimension of pores, the dimension of compressible hollow particles depends on the thickness of the layer they are to be incorporated. For example, if the compressible hollow particles are incorporated in a positive electrode layer with a thickness of one micrometer, the diameter of the compressible hollow particles should on the lower end of the range, e.g. in a range around 50 to 300 nm. If, for the compressible hollow particles are incorporated in a current collector with a thickness of five micrometer the diameter may be larger, e.g. in a range up to two micrometer. Preferably, the hollow core comprises a gas. By providing the hollow particles with a gas, the particle may be compressible and elastic. It is believed that by compressing a particle comprising a gas-filled core, the pressure of the gas in the particle may increase during compression. When the external force that compresses the particles is reduced the elevated gas pressure inside the hollow particle may cause the particle to re-expand, e.g. to an original volume. In addition, the elastic properties of the shell, may help in the recovery of the original volume.

In some preferred embodiments the hollow compressible particles 10 are hollow latex beads 11. Preferably, the hollow latex beads have a volumetric core to shell ratio ($V_{core}/V_{shell}$) in a range from 5 to 0.05, and wherein the hollow latex beads have a diameter in a range between 50 nanometer and 5 micrometer, preferably in a range between 200 and 1000 nanometer. Beads with large pores may be compressible to a lager extent. Beads with thick shells may be more resilient and may be more elastic. It will be appreciated that, similar to the dimension of pores, beads with a small dimension relative to the thickness of the layer they are comprised in may be dispersed more evenly. Homogeneous of beads may lead to even compressible and elastic layers that allow for even accommodation of expansion/shrinkage of electrodes during operation of the rechargeable battery cell.

The compressible elastic composite material C may be comprised in any one or more of the functional layers within a battery stack.

Figure 2B:
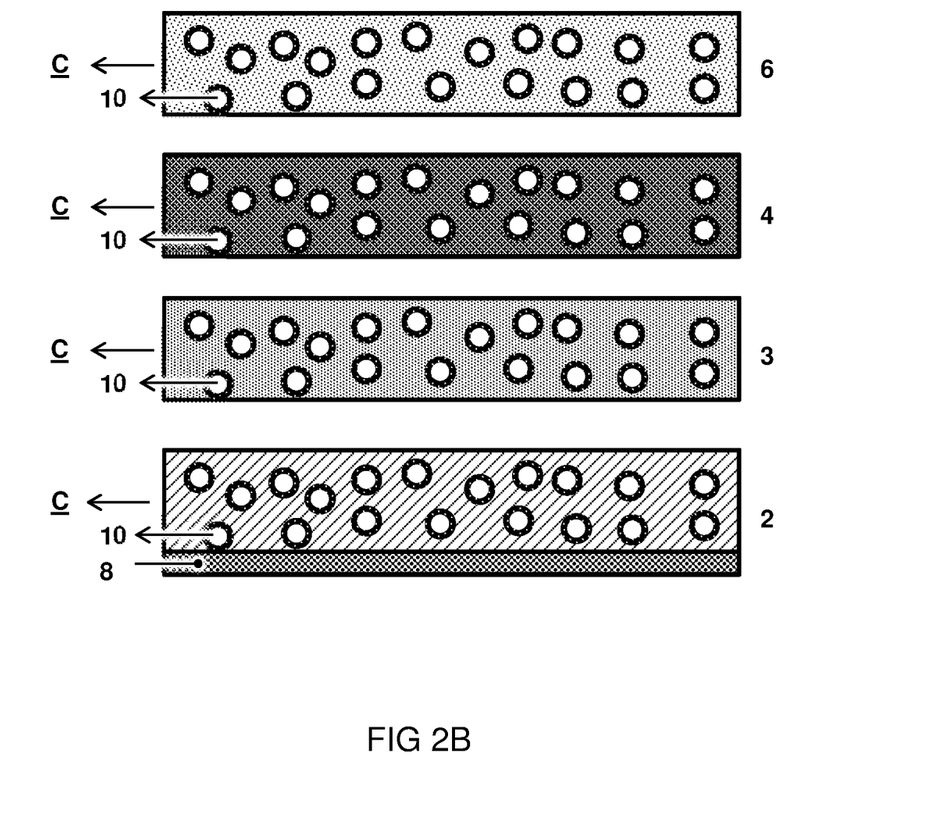
FIG. 2B depicts a schematic cross-section views of compressible and elastic current collectors, a solid state electrolyte, and a solid state electrode.

FIG. 2B depicts schematic cross-section views of exemplary embodiments of a compressible and elastic first current collector 2, a compressible and elastic solid state electrolyte 4, a compressible and elastic positive electrode 3, and a compressible and elastic second current collector 2 that is provided with an electrically conductive capping layer 8.

As stated before, it is an aspect of the present disclosure to provide a rechargeable battery cell wherein one or more of the functional layers in the stack forming the cell is provided with a compressible elastic composite material C to, at least in part, counter act compressive and/or tensile forces within the stack resulting from volume changes in the negative and/or positive electrode during charging and/or discharging of the rechargeable battery cell.

Accordingly, the present disclosure relates to a rechargeable battery cell wherein one or more of the first and second current collector 2,6 is provided with the compressible elastic composite material C and an electrically conductive material to form a compressible and elastic current collector. In one embodiment, e.g. as shown in FIG. 2B, the compressible elastic composite material C comprises hollow compressible particles 10. The conductive material comprises one or more of: carbon black powder, carbon nanotubes, graphene, carbon fibers, graphite, conductive particles, metal particles, conductive nanowires, and conductive polymers, e.g. polyaniline and polythiophene, and/or conductive copolymer. Alternatively or in addition, the compressible elastic composite material C may comprise a conductive polymer. In some preferred embodiments, the compressible elastic composite material C comprises hollow latex beads 11. In some of these embodiments, the elastic properties may be provided by hollow latex beads. Alternatively or in addition, the hollow latex beads 11 are electrically conductive.

The present disclosure further relates to a rechargeable battery cell, wherein the solid state electrolyte 4 comprises the compressible elastic composite material C formed of: d a solid state electrolyte material to form a compressible and elastic solid state electrolyte. In one embodiment, e.g. as shown, the compressible elastic composite material C, comprises hollow compressible particles. The solid state electrolyte comprises an ion conductive polymer and one or more salts Typically the ion conductive polymer may be polyether polymer such as one or more of polyethylene glycol, polypropylene glycol and glycol comprising copolymers. Preferably, the salt comprises a non-coordinating anion and a metal cation that corresponds to the metal used in the negative electrode. For example, in case of a lithium ion battery, the solid state electrolyte may comprise a lithium salt and polyethylene glycol. In some preferred embodiments, the compressible elastic composite material C comprises hollow latex beads 11. In some of these embodiments, the elastic properties may be provided by hollow latex beads. Alternatively or in addition, the hollow latex beads are provided with an ion conductive coating. Providing the hollow latex beads with an ion conductive coating may improve ion conductivity throughout the compressible and elastic solid state electrolyte and/or improve compatibility between coated hollow latex beads and the solid state electrolyte material. Alternatively or in addition, the solid state electrolyte layer may be provided with a layer of a lithiophilic metal oxide for improving wettability at the interface between the electrolyte layer and of the lithium metal electrode. Alternatively or in addition, the compressible and elastic solid state electrolyte layer current collector layer may at the interface to a negative electrode be provided with a layer of a lithiophilic metal oxide for improving wettability at the interface between the current collector layer and the lithium metal electrode to mitigate non uniform electrode material plating and further mitigate dendrite formation. Preferably the lithiophilic metal oxide is selected from a group consisting of $ZnO$, $Al_2O_3$, $Fe_2O_3$, $CoO_2$, $MnO_2$, $V_2O_5$, and $TiO_2$.

The present disclosure further relates to a rechargeable battery cell, wherein the positive electrode 3 comprises the compressible elastic composite material C formed of: a positive electrode material, an ionically conductive material, and an electronic conductive material dispersed throughout the compressible elastic composite material C, to form a compressible and elastic positive electrode. In one embodiment, e.g. as shown, the positive electrode comprises hollow compressible particles 10. The conductive material comprises one or more of: carbon black powder, carbon nanotubes, graphene, carbon fibers, graphite, conductive particles, metal particles, conductive nanowires, and conductive polymers, e.g. polyaniline and polythiophene. Dispersing additives might be added to form homogenous mixtures binder materials may be used for the electrode fabrication. In some preferred embodiments, the compressible elastic composite material C comprises hollow latex beads 11. In some of these embodiments, the elastic properties may be provided by hollow latex beads. Alternatively or in addition, the hollow latex beads are provided with an electrically conductive coating. Providing the hollow latex beads with an electrically conductive coating may improve conductivity throughout the compressible and elastic positive electrode. Alternatively or in addition, the hollow latex beads are provided with an ion conductive coating. Providing the hollow latex beads with an ion conductive coating may improve ion conductivity throughout the compressible and elastic positive electrode.

The present disclosure further relates to a rechargeable battery cell wherein, the negative electrode 5 comprises the compressible elastic composite material C formed of a negative electrode material, an ionically conductive material, and an electronically conductive material to form the compressible and elastic negative electrode 5. The conductive material comprises one or more of: carbon black powder, carbon nanotubes, graphene, carbon fibers, graphite, conductive particles, metal particles, conductive nanowires, and conductive polymers, e.g. polyaniline and polythiophene. Dispersing additives might be added to form homogenous mixtures binder materials may be used for the electrode fabrication. In some preferred embodiments, the compressible elastic composite material C comprises hollow latex beads 11. In some of these embodiments, the elastic properties may be provided by hollow latex beads. Alternatively or in addition, the hollow latex beads are provided with an electrically conductive coating. Providing the hollow latex beads with an electrically conductive coating may improve conductivity throughout the compressible and elastic negative electrode.

In other or further embodiments a rechargeable battery cell is provided, wherein the one or more of the first and second compressible and elastic current collectors is provided with an electrically conductive capping at an interface to connect to the negative or positive electrode. Preferably, the capping layer has an elastic modulus that is higher that the elastic modulus of the electrode it is in contact with. Having a capping layer that is harder than the electrode it is in contact may allow for more uniform pressure distribution, e.g. uniform compression along the layer, and accordingly mitigate mechanical degradation of the compressible layer. In embodiments wherein the capping layer is in contact with a lithium metal electrode the modulus of the capping layer is preferably larger than 4.9 GPa. Having a capping layer with a modulus>4.9 GPa may further prevent lithium dendrite formation. Alternatively or in addition, the elastic current collector layer for collecting electrons from a negative lithium electrode may be provided with a layer of a lithiophilic metal oxide for improving wettability at the interface between the current collector layer and the lithium metal electrode to mitigate non uniform electrode material plating and further mitigate dendrite formation. Preferably the lithiophilic metal oxide is selected from a group consisting of ZnO, Al2O3, Fe2O3, CoO2, MnO2, V2O5, and TiO2.

In other or further embodiments, a rechargeable battery cell is provided, wherein the one or more of the first and second compressible and elastic current collectors is at least in part provided with a conductive metal layer to improve spatial conductivity of the compressible and elastic current collectors. The metal layer may be provided as a foil or as a mesh and can be either embedded in the current collector, or provided at a surface. Alternatively or in addition, the compressible and elastic current collector can be sandwiched between two metal foils, metal meshes, or a combination thereof. Providing a good spatial high conductivity is particularly important at the interface for connecting to a negative electrode. Fox example in a rechargeable lithium metal battery, inhomogeneous spatial conductivity may, during a charging cycle, lead to inhomogeneous electric field formation and may thus lead to inhomogeneous electrode material deposition and/or plating and may lead to formation of dendrites. Accordingly, the present disclosure relates to a compressible and elastic current collector wherein the compressible and elastic current collector is provided with a metal film at the interface for connecting to a negative electrode material. Compressible and elastic current collectors for connecting to a positive electrode material are preferably provided with a metal mesh, as homogeneous spatial conductivity is less critical at these interfaces. By providing the compressible and elastic current collector for connecting to a positive electrode material with a metal mesh may allow manufacturing of rechargeable battery cells with improved gravimetric energy density, e.g. an increased energy output of the cell per total mass of the cell compared to a similar cell that is provided with a metal film instead of a mesh). Alternatively of in addition, the compressible elastic current collector for collecting electrons from a negative lithium electrode may be a hybrid laminate formed with a metal grid inside the current collector layer and wherein the elastic current collector comprises a capping layer facing the lithium electrode to prevent formation of dendrites, wherein the capping layer also comprises electrically conductive material dispersed throughout the capping layer to form an electrically conductive network across the capping layer.

The present disclosure further relates to a rechargeable battery cell according to any of the preceding claims, wherein the stack of functional layers forms an essentially planar structure. In other words, wherein the stack forms a so called 2D structure, e.g. in a battery pouch layout. It will be appreciated that other cells comprising a multitude of such stacks, e.g. battery cell formed of a stack of cells, and cells with non-planar geometries, such as cylindrical geometries wherein the stack is wound around a central axis are envisioned as well.

Figure 3:
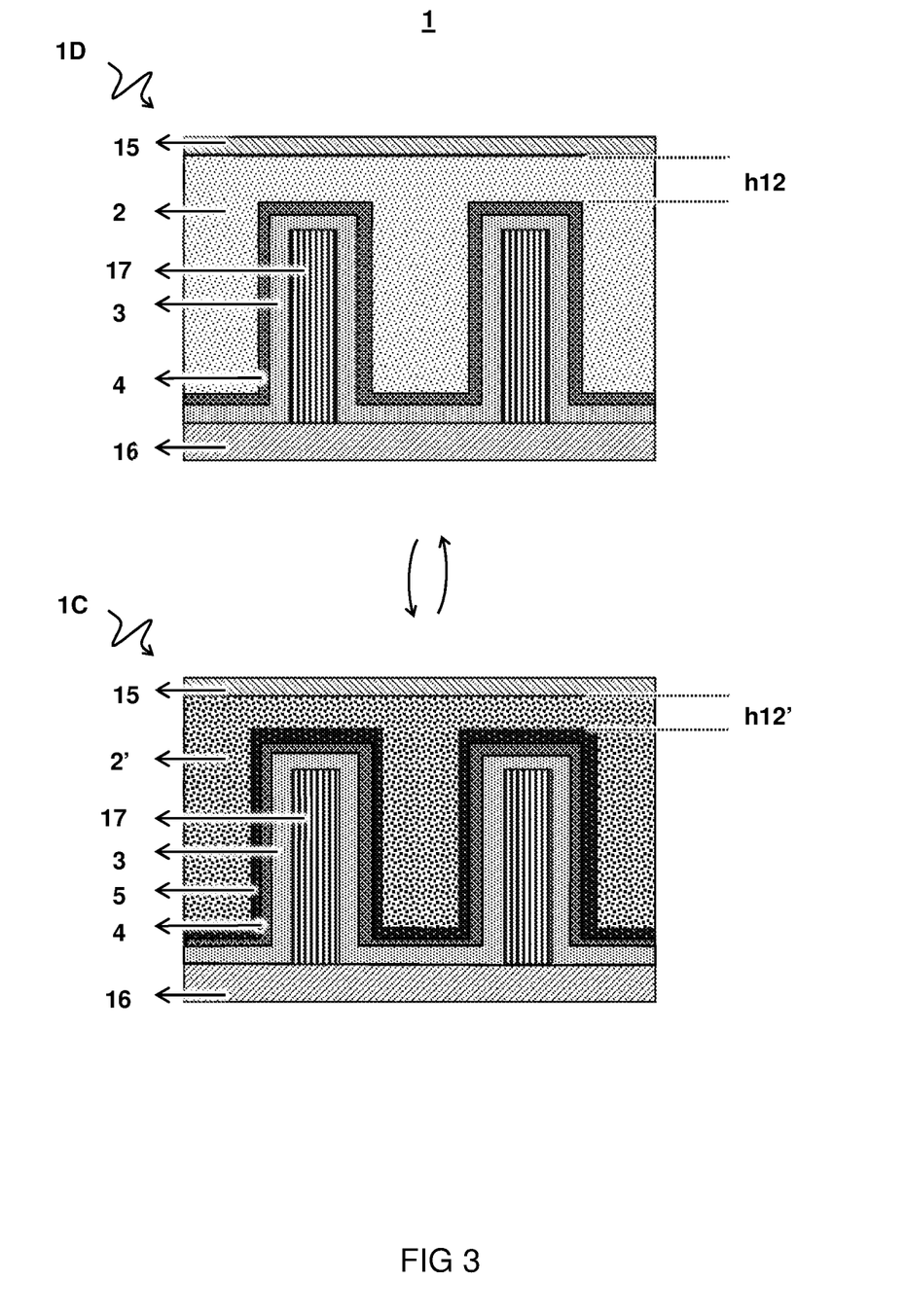
FIG. 3 depicts schematic cross-section views of a rechargeable 3D battery cell in charged and discarded state illustrating a compressible and elastic current collector counteracting volume changes in the negative electrode.

In some embodiments, e.g. as shown in FIG. 3, the present disclosure relates to a rechargeable battery cell 1, wherein the cell is formed of a conductive base structure 16 comprising an array of conductive elements 17 spaced at a distance from one another and extending in a direction away from said base, and wherein at least the electrolyte and one of the positive and negative electrode is provided between said extending elements. Such cell may be described as 3D cells. By providing 3D structured cells, batteries may be manufactured with increased energy output. FIG. 3 schematically depicts cross section views of a rechargeable battery cell 1 in a discharged state 1D (top) and a charged state 1C (bottom). The 3D cell comprises a bottom current collector formed of a base structure 16 and an array of conductive elements 17, and the positive electrode material 3 and solid state electrolyte 4 are provided as layers that follow the bottom current collector in a conformal way. In the embodiment as shown, a compressible and elastic top current collector 2,2' is provided on top and in the remaining spaces between the coated 3D current collector. The whole cell is sandwiched between rigid top and bottom current collectors 15, 16. By providing the 3D rechargeable battery cell with a compressible and elastic layer that is provided between the extending conductive elements 15 a cell is provided that can accommodate for volume changes, e.g. in the negative electrode 5, in a lateral direction.

The present disclosure also relates to a process for manufacturing a rechargeable battery cell 1 comprising a compressible elastic composite material C. The process comprises one or more of: providing a compressible elastic composite material C to form a compressible and elastic first current collector 2; providing a compressible elastic composite material C to form a compressible and elastic positive electrode 3; providing a compressible elastic composite material C to form a compressible and elastic solid state electrolyte 4; providing a compressible elastic composite material C to form a compressible and elastic negative electrode 5; and providing a compressible elastic composite material C to form a compressible and elastic second current collector 6, and wherein a plurality of compressible pores P is provided to the compressible elastic composite material C by preparing a mixture comprising one or more pore forming agents. Addition of a solid state electrolyte forming material to the mixture allows forming a compressible and elastic solid-state electrolyte, addition of an electrode material allows forming a compressible and elastic electrode, and addition of a current collector material allows forming a compressible and elastic current collector. The pore forming agents comprise are one or more of: hollow particles 10, hollow latex beads 11, foaming agents, solvents, and dissolved gasses. Examples of suitable foaming organic and inorganic agents include NaHCO3, NH4HCO3, NaNO2, NH4NO2, azodicarbonamide, oxybis (benzensulphonyl hydrazide), p-toluenesulphonyl hydrazide, toluenesulphonyl semicarbazide, and 5-phenyltetrazole. Alternatively solvents, e.g. H2O may be used as foaming agent.

The current collector forming material in the mixture for forming a compressible and elastic current collector further comprises conductive material selected from one or more of: carbon black powder, carbon nanotubes, graphene, carbon fibers, graphite, conductive particles, metal particles, conductive nanowires, and conductive polymers, e.g. polyaniline and polythiophene; and dispersing agents for dispersing one or more of the conductive materials and compressible porous particles. The electrolyte material in the mixture for forming a compressible and elastic solid state electrolyte comprises an ion conductive polymer and one or more salts. For example, the solid state electrolyte may comprise a lithium salt and a polyether polymer such as one or more of polyethylene glycol, polypropylene glycol and glycol comprising copolymers. Alternatively or in addition, the solid state electrolyte layer may be provided with a layer of a thin, 5 to 10 nm thick, layer of lithiophilic metal oxide for improving wettability at the interface between the electrolyte layer and of the lithium metal electrode. The electrode material in the mixture for forming a compressible and elastic positive electrode comprises the positive electrode material, ionically conductive material and an electronically conductive material. Dispersing additives might be added to form homogenous mixtures binder materials may be used for the electrode fabrication. The electrode material in the mixture for forming a compressible and elastic negative electrode comprises the negative electrode material, an ionically conductive material and an electrically conductive material. The electrically conductive material comprised in the one or more mixtures to form an electrode comprises one or more of: carbon black powder, carbon nanotubes, graphene, carbon fibers, graphite, conductive particles, metal particles, conductive nanowires, and conductive polymers, e.g. polyaniline and polythiophene.

Preferably, the compressible functional layer may be casted directly on to any one of the functional layers comprised in a rechargeable battery cell, e.g. a compressible electrolyte layer may be cased on to a functional layer comprising a positive electrode material. Alternatively, the mixture for forming the compressible and elastic layer may be casted onto one or more of a: carrier substrate, a metal foil or mesh. In embodiments wherein the mixture comprises a monomer, a polymerization step of said monomer follows after casting of the mixture. In embodiments wherein the one or more pore forming agents comprise a foaming agent, a solvent, and dissolved gasses, the process comprises activating said pore forming agent to form the plurality of pores, wherein said activation is performed by one or more of applying a low pressure and elevated temperature for a time and at a temperature sufficient to activate the pore forming agent. Preferably, the activation is followed by an exchanging step wherein released gasses anchor vapors are exchanged with argon or nitrogen by applying one or more of the respective gas-vacuum cycles. When using lithium metal materials argon is preferred because argon does react with lithium.

In embodiments wherein a 3D rechargeable battery cell is formed, the mixture may be casted on to a rigid 3D structure by vacuum impregnation. In embodiments wherein the resulted component mixture is meltable, a melt extrusion processing may be used for casting.

In a preferred embodiment, the pore forming agent comprises hollow particles, more preferably hollow latex beads 11. In contrast to foaming agents, pores formed by hollow particles and/or latex beads may be provided with more control over pore size and pore distribution.

In some preferred embodiments, the process for manufacturing a rechargeable battery cell 1 comprising a compressible elastic composite material C comprises providing hollow latex beads to the mixture wherein the hollow latex beads 11 provided by: obtaining core-shell polymer latex beads, wherein the core comprises a aqueous gel and drying the core-shell polymer latex beads comprises freeze-drying or a liquid-gas phase exchange process using a dry gas flow. Optionally, the process for providing the hollow latex beads comprises applying an electrically conductive coating 18 to the dried conductive hollow latex beads. Suitable electrically conductive coatings are preferably selected from a group consisting of carbonaceous material (e.g. carbon black, graphene, carbon nanotubes), metal, metal oxide, conductive polymer, e.g. (polyaniline, poly ethylenedioxythiophene(PEDOT)).

Figure 4:
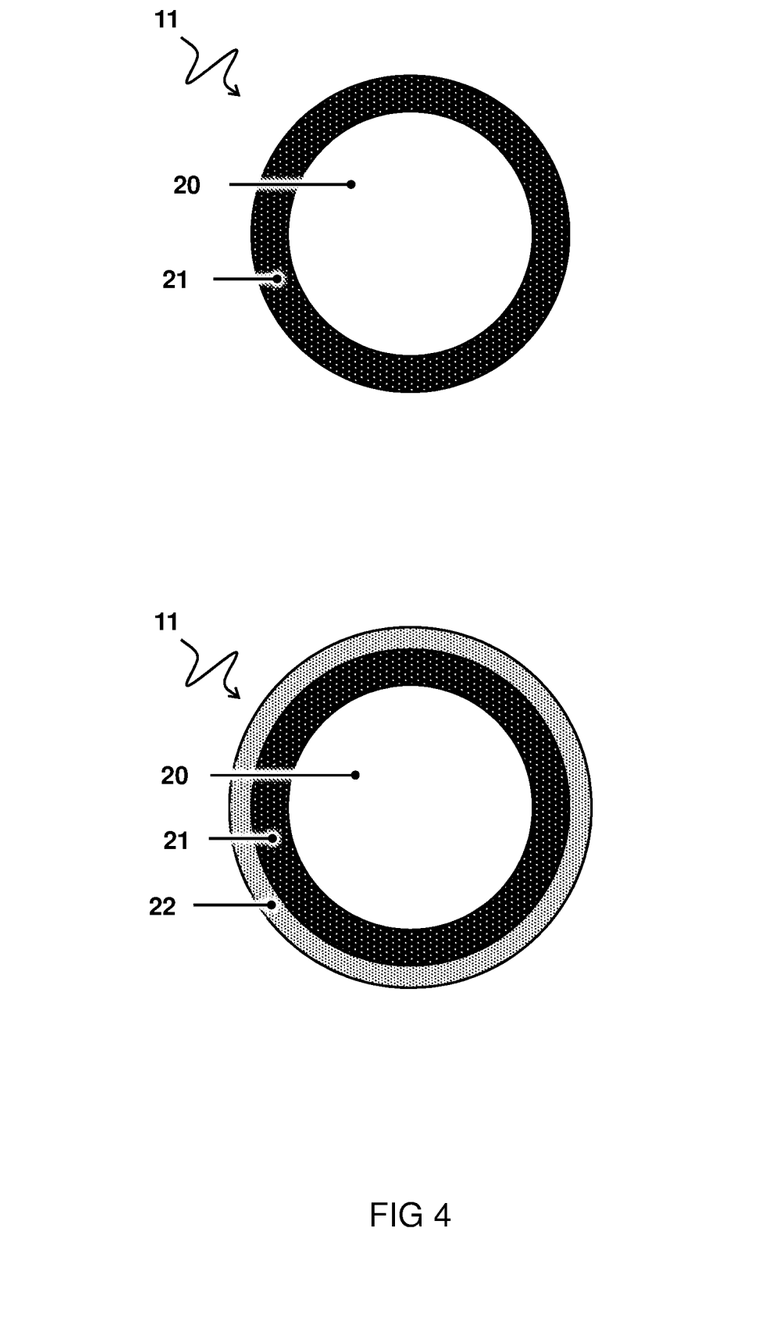
FIG. 4 depicts schematic cross-section views of hollow latex beads.

Accordingly, the present disclosure relates to hollow latex beads, as shown in FIG. 4, obtainable as intermediate products by the process for manufacturing a rechargeable battery cell wherein the process is limited to: obtaining core-shell polymer latex beads wherein the core comprises a aqueous gel and drying the core-shell polymer latex beads by freeze-drying or by a liquid-gas phase exchange process using a continuous dry gas flow. The present disclosure further relates to conductive hollow latex beads obtainable as intermediate products by the process for manufacturing a rechargeable battery cell wherein the process is limited to: obtaining core-shell 21 polymer latex beads wherein the core 20 comprises an aqueous gel and drying the core-shell polymer latex beads by freeze-drying or by a liquid-gas phase exchange process using a continuous dry gas flow and the coating is provided by solution processing using aqueous emulsions or dry processing using fluidized bead ALD, PLD, CVD processes. The coating 22 is preferably selected from one or more in a group consisting of carbonaceous material (e.g. carbon black, graphene, carbon nanotubes), metal, metal oxide, conductive polymer, e.g. (polyaniline, PEDOT). Core-shell polymer latex beads wherein the core comprises an aqueous gel may be commercially obtained with a diameter in a range between 100 and 1000 nanometer. It will be appreciated that other sources of core-shell polymer latex beads and core-shell polymer latex beads with different diameters may be applied as well.

In some embodiments the compressible and elastic current collector can be manufactured by casting a polymer composite solution comprising the conductive additives and pores forming agents, and one or more of a molten polymer and monomer composition. In embodiments comprising a monomer composition casting is followed by in-situ polymerization. In case of films containing foaming agents, the casted films are further thermally treated to activate foaming agents. The produced reactive gases are exchanged with argon or nitrogen by applying vacuum-gas cycles wherein for lithium metal. Argon is preferred when using lithium metal materials because argon does react with lithium.

The invention claimed is:
1. A rechargeable battery cell comprising a functional layer made of a compressible elastic composite material comprising compressible pores, wherein the functional layer is taken from the group consisting of:
a compressible and elastic first current collector; and
a compressible and elastic second current collector;
wherein the compressible elastic composite material is configured to, at least in part, counteract compressive and/or tensile forces within the rechargeable battery cell resulting from volume changes in a negative electrode and/or a positive electrode during charging and/or discharging the rechargeable battery cell,
wherein the compressible pores are at least in part provided by hollow latex beads having a volumetric core to shell ratio in a range from 5 to 0.05, and having a diameter in a range between 50 nanometers and 5 micrometers, and wherein the compressible pores have a diameter that is:
less than 20% of a thickness of the functional layer made of a compressible elastic composite material comprising compressible pores, and
in a range between 1 micrometer and 50 nanometers; and wherein the compressible pores are homogeneously dispersed throughout the compressible elastic composite material, and wherein the compressible elastic composite material is electrically conductive.

2. The rechargeable battery cell according to claim 1, wherein one or more of the first compressible and elastic current collector and the second compressible and elastic current collector comprises the compressible elastic composite material and an electronic electronically conductive material, thereby providing a compressible characteristic.

3. The rechargeable battery cell according to claim 2, wherein the one or more of the first compressible and elastic current collector and the second compressible and elastic current collector comprises an electrically conductive capping.

4. The rechargeable battery cell according to claim 2, wherein the one or more of the first compressible and elastic current collector and the second compressible and elastic current comprises, at least in part, a conductive metal film providing homogeneous conductivity along an electrode material interface.

5. The rechargeable battery cell according to claim 1, wherein:
a stack of functional layers forms a planar structure, or
the rechargeable battery cell is formed of a base current collecting structure comprising an array of conductive elements spaced at a distance from one another and extending in a direction away from said base, and wherein at least one of the electrode and solid state electrolyte is provided between said elements.

6. The rechargeable battery cell according to claim 1, comprising at least one rigid external current collector.

* * * * *